United States Patent
Wang et al.

(10) Patent No.: US 11,661,088 B2
(45) Date of Patent: May 30, 2023

(54) SYSTEM AND METHOD FOR SCHEDULING CONNECTED VEHICLES TO CROSS NON-SIGNALIZED INTERSECTIONS

(71) Applicant: Toyota Motor Engineering & Manufacturing North America, Inc., Plano, TX (US)

(72) Inventors: Ziran Wang, San Jose, CA (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/193,278

(22) Filed: Mar. 5, 2021

(65) Prior Publication Data

US 2022/0281489 A1    Sep. 8, 2022

(51) Int. Cl.
*B60W 60/00* (2020.01)
*B60W 30/18* (2012.01)
(Continued)

(52) U.S. Cl.
CPC ........... *B60W 60/00276* (2020.02); *B60W 30/18109* (2013.01); *G08G 1/0112* (2013.01); *G08G 1/0125* (2013.01); *G08G 1/123* (2013.01)

(58) Field of Classification Search
CPC ...... B60W 30/18109; B60W 60/00276; G08G 1/0112; G08G 1/0116; G08G 1/0125; G08G 1/0129; G08G 1/0141; G08G 1/0145; G08G 1/015; G08G 1/052; G08G 1/056; G08G 1/08; G08G 1/083; G08G 1/093; G08G 1/123
See application file for complete search history.

(56) References Cited

U.S. PATENT DOCUMENTS

| | | | |
|---|---|---|---|
| 10,509,406 B2 | 12/2019 | Choi et al. | |
| 2001/0034575 A1* | 10/2001 | Takenaga | B60K 31/0058 180/170 |

(Continued)

FOREIGN PATENT DOCUMENTS

| CN | 111445692 A | 7/2020 |
|---|---|---|
| CN | 111508244 B | 9/2020 |

(Continued)

OTHER PUBLICATIONS

K. Dresner and P. Stone, "A Multiagent Approach to Autonomous Intersection Management" Journal of Artificial Intelligence Research, vol. 31, pp. 591-656, 63 pages; 2008.

(Continued)

*Primary Examiner* — Peter D Nolan
*Assistant Examiner* — Ce Li Li
(74) *Attorney, Agent, or Firm* — Dinsmore & Shohl LLP (57) ABSTRACT

A method comprises receiving driving data from a plurality of connected vehicles approaching an intersection, the driving data comprising a speed and position of a connected vehicle, determining estimated times of arrival that each of the connected vehicles will arrive at the intersection based on the driving data, scheduling the connected vehicles to cross the intersection in a particular order based on the estimated times of arrival, and transmitting the scheduled order to the connected vehicles.

18 Claims, 8 Drawing Sheets

(51) Int. Cl.
*G08G 1/01* (2006.01)
*G08G 1/123* (2006.01)

(56) References Cited

U.S. PATENT DOCUMENTS

| | | | | |
|---|---|---|---|---|
| 2017/0205825 | A1* | 7/2017 | Wang | G05D 1/0088 |
| 2018/0082587 | A1* | 3/2018 | Wan | G05D 1/0088 |
| 2019/0031172 | A1* | 1/2019 | Kodera | B60W 20/16 |
| 2019/0236948 | A1* | 8/2019 | Wang | G08G 1/096725 |
| 2020/0234578 | A1* | 7/2020 | Zhang | G08G 1/052 |
| 2020/0307630 | A1* | 10/2020 | Ueda | B60W 60/0011 |
| 2021/0183243 | A1* | 6/2021 | Mobasser | G08G 1/08 |

FOREIGN PATENT DOCUMENTS

| | | |
|---|---|---|
| CN | 108281026 B | 11/2020 |
| CN | 111884850 A | 11/2020 |
| KR | 20180065196 A | 6/2018 |

OTHER PUBLICATIONS

F. Zhu and S. Ukkusuri, "A Linear Programming Formulation for Autonomous Intersection Control Within a Dynamic Traffic Assignment and Connected Vehicle Environment," Transportation Research Part C: Emerging Technologies, vol. 55, pp. 363-378, 2015, Engineering and Applied Sciences Optimization (OPT-i)—Professor Matthes G. Karlaftis Memorial Issue; http://www.sciencedirect.com/science/article/pii/S0968090X1500008X.

Y. Zhang et al.; "Optimal Control and Coordination of Connected and Automated Vehicles at Urban Traffic Intersections," in 2016 American Control Conference (ACC), 2016, pp. 6227-6232.

K. Zhang, D. Zhang, A. de La Fortelle, X. Wu, and J. Gregoire, "State-Driven Priority Scheduling Mechanisms for Driverless Vehicles Approaching Intersections," IEEE Transactions on Intelligent Transportation Systems, vol. 16, No. 5, pp. 2487-2500, 2015.

A. de La Fortelle, "Analysis of Reservation Algorithms for Cooperative Planning at Intersections," in 13th International IEEE Conference on Intelligent Transportation Systems, Sep. 2010, pp. 445-449.

D. Fajardo et al.; "Automated Intersection Control: Performance of Future Innovation versus Current Traffic Signal Control"; Transportation Research Record, vol. 2259, No. 1 pp. 223-232, 2011, https://doi.org/10.3141/2259-21.

Q. Jin et al.; "Platoon-Based Multi-Agent Intersection Management for Connected Vehicle" in 2013 16th International IEEE Conference on Intelligent Transportation Systems (ITSC), Oct. 2013, pp. 1462-1467.

J. Lee and B. Park, "Development and Evaluation of a Cooperative Vehicle Intersection Control Algorithm Under the Connected Vehicles Environment," IEEE Transactions on Intelligent Transportation Systems, vol. 13, No. 1, pp. 81-90, 2012.

A. A. Malikopoulos et al.; "A Decentralized Energy-Optimal Control Framework for Connected Automated Vehicles at Signal-Free Intersections"; Automatica, vol. 93 pp. 244-256, 2018; http://www.sciencedirect.com/science/article/pii/S0005109818301511.

A. I. M. Medina et al.; "Cooperative Intersection Control Based on Virtual Platooning," IEEE Transactions on Intelligent Transportation Systems, vol. 19, No. 6, pp. 1727-1740, 2018.

A. Mirheli et al.; "A Consensus-Based Distributed Trajectory Control in a Signal-Free Intersection"; Transportation Research Part C: Emerging Technologies, vol. 100, pp. 161-176, 2019; http://www.sciencedirect.com/science/article/pii/S0968090X18311343.

N. Neuendorf and T. Bruns; "The Vehicle Platoon Controller in the Decentralized, Autonomous Intersection Management of Vehicles," in Proceedings of the IEEE International Conference on Mechatronics, 2004. ICM '04, Jun. 2004, pp. 375-380.

Y. Xing et al.; A Right-of-Way Based Strategy to Implement Safe and Efficient Driving at Non-Signalized Intersections for Automated Vehicles; 6 pages; https://arxiv.org/ftp/arxiv/papers/1905/1905.01150.pdf.

Multicriteria Autonomous Vehicle Control at Non-Signalized Intersections, 29 pages, https://www.mdpi.com/2076-3417/10/20/7161/htm.

F. Yan, "Autonomous Vehicle Sequencing Algorithm at Isolated Intersections"; in 2009 12th International IEEE Conference on Intelligent Transportation Systems, 2009, pp. 1-6.

L. Li and F. Wang, "Cooperative Driving at Blind Crossings Using Inter-Vehicle Communication", IEEE Transactions on Vehicular Technology, vol. 55, No. 6, pp. 1712-1724, 2006.

B. Xu et al.; "Distributed Conflict-Free Cooperation for Multiple Connected Vehicles at Unsignalized Intersections," Transportation Research Part C: Emerging Technologies, vol. 93, pp. 322-334, 2018.

M. Tlig; "Decentralized Traffic Management: A Synchronization-Based Intersection Control"; in 2014 International Conference on Advanced Logistics and Transport (ICALT), 2014, pp. 109-114.

* cited by examiner

SYSTEM AND METHOD FOR SCHEDULING CONNECTED VEHICLES TO CROSS NON-SIGNALIZED INTERSECTIONS

TECHNICAL FIELD

The present specification relates to a traffic management system and more particularly to a system and method for scheduling connected vehicles to cross non-signalized intersections.

BACKGROUND

As automobiles or other vehicles approach an intersection while driving along a road, vehicles must take into account other vehicles in order to cross the intersection. Many intersections have traffic signals to manage vehicle traffic at the intersections. However, many other intersections do not have traffic signals. At these intersections, vehicles must navigate the intersection without the assistance of traffic signals.

Traffic rules and laws have been created to instruct drivers as to which vehicles have the right of way when crossing an intersection without traffic signals. For human-driven, non-connected vehicles, drivers may rely on these traffic rules and their own judgment and observation of other vehicles to cross such an intersection. However, connected vehicles, either human-driver or autonomous, may communicate with each other and/or a traffic management server in order to negotiate an intersection. In particular, as a plurality of connected vehicles approach an intersection without traffic signals, the connected vehicles may be assigned an order to cross the intersection. The connected vehicles may then cross the intersection in the assigned order, thereby avoiding any conflicts.

When a traffic management server assigns an order for connected vehicles to cross an intersection, the order may be based on a First-In-First-Out (FIFO) algorithm. That is, the order for the connected vehicles to cross the intersection may be based on the position of the vehicles (e.g., the distance of each connected vehicle to the intersection). For example, the connected vehicle closest to the intersection may be assigned the first slot to cross the intersection and the connected vehicle that is furthest from the intersection may be assigned the last slot to cross the intersection. However, assigning an order for connected vehicles to cross an intersection in this manner fails to take into account vehicle speeds and other factors and may lead to inefficiencies. For example, a first vehicle that is slightly further away from an intersection than a second vehicle may have a higher speed than the second vehicle. Thus, if the first vehicle is scheduled to cross the intersection after the second vehicle, the first vehicle may have to significantly reduce its speed as it approaches the intersection. Thus, there is a need for an improved system and method for scheduling connected vehicles to cross non-signalized intersections.

SUMMARY

In an embodiment, a method may include receiving driving data from a plurality of connected vehicles approaching an intersection, determining estimated times of arrival that each of the connected vehicles will arrive at the intersection based on the driving data, scheduling the connected vehicles to cross the intersection in a particular order based on the estimated times of arrival, and transmitting the scheduled order to the connected vehicles. The driving data may include a speed and position of a connected vehicle.

In another embodiment, a server may include a controller configured to receive driving data from a plurality of connected vehicles approaching an intersection, determine estimated times of arrival that each of the connected vehicles will arrive at the intersection based on the driving data, schedule the connected vehicles to cross the intersection in a particular order based on the estimated times of arrival, and transmit the scheduled order to the connected vehicles. The driving data may include a speed and position of a connected vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a system and method for scheduling connected vehicles to cross a non-signalized intersection. It is expected that the number of connected vehicles on the road (both human driven and autonomous) will increase around the world in the next several decades. A connected vehicle is able to communicate remotely with systems outside of the vehicle (e.g., a traffic management server or other vehicles).

As connected vehicles approach an intersection without traffic signals (referred to herein as a non-signalized intersection), the connected vehicles may transmit driving information (e.g., the location and speed of the vehicle) to a traffic management server. The traffic management server may receive the driving information from a plurality of connected vehicles approaching an intersection and may schedule the vehicles to cross the intersection using an enhanced FIFO algorithm, as disclosed herein.

In particular, the server may determine an estimated time of arrival indicating a time that each connected vehicle is estimated to arrive at the intersection. The server may then schedule each connected vehicle to cross the intersection in an order based on the estimated time of arrival of each vehicle to the intersection. That is, the first vehicle estimated to arrive at the intersection may be scheduled to cross the intersection first, the next vehicle estimated to arrive at the intersection may be scheduled to cross the intersection second, and so on. The server may then transmit the scheduled order to the connected vehicles. The connected vehicles may receive the scheduled order and may adjust their driving behavior (e.g., adjusting a speed) accordingly such that the connected vehicles cross the intersection in the scheduled order. While this disclosure refers to vehicles crossing an intersection, it should be understood that this term encompasses vehicles navigating an intersection in any manner (e.g., driving through the intersection, turning, etc.).

By scheduling connected vehicles to cross an intersection in an order based on estimated time of arrival, traffic efficiency may be improved compared with scheduling connected vehicles using other methods. For example, in other methods, connected vehicles may be scheduled to cross an intersection in an order based on a distance of each connected vehicle to the intersection. That is, a first connected vehicle that is closer to an intersection may be scheduled to cross the intersection before a second vehicle that is further away from the intersection. However, if the second vehicle is driving faster than the first vehicle, this may require the second vehicle to significantly slow down in order to allow the first vehicle to cross the intersection first. If instead, the vehicles are scheduled to cross the intersection based on their estimated time of arrival, as disclosed herein, the second vehicle may be scheduled to cross the intersection before the first vehicle, even though the second vehicle is initially further from the intersection. As such, the second vehicle may not need to slow down, thereby increasing traffic flow and efficiency.

Figure 1:
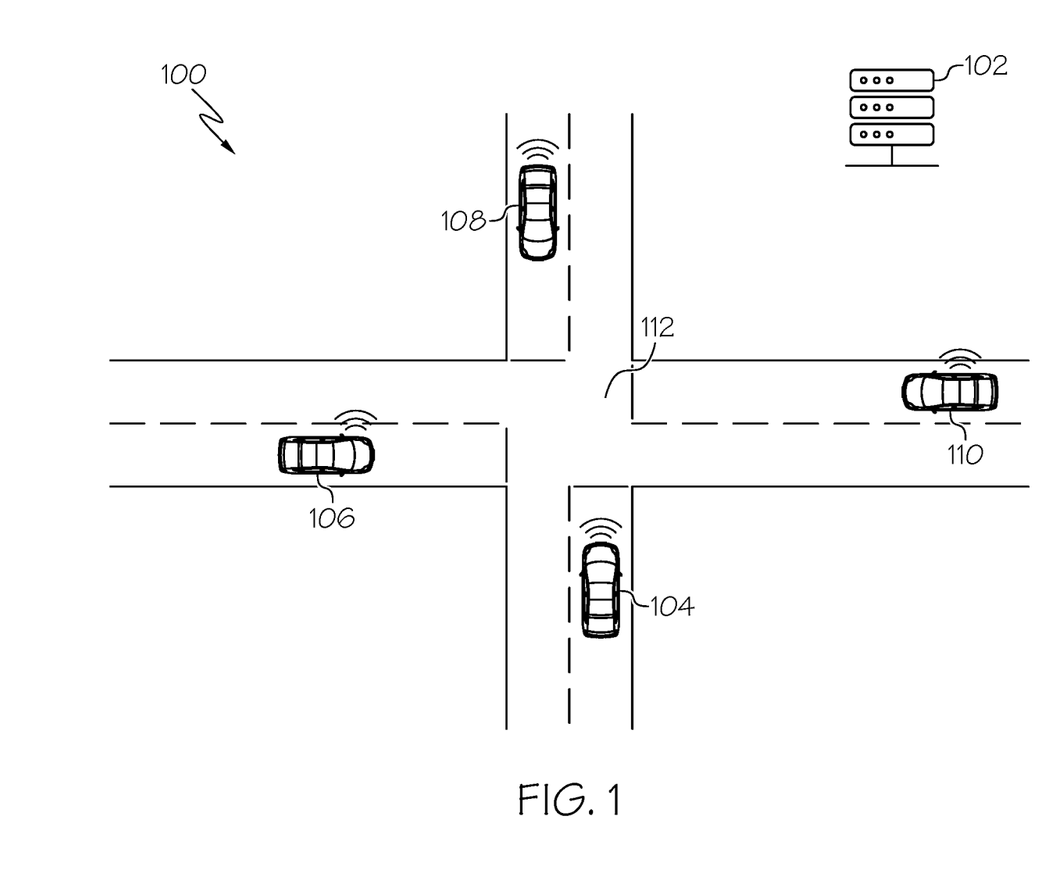
FIG. 1 schematically depicts a system comprising a traffic management server, according to one or more embodiments shown and described herein.

Turning now to the figures, FIG. 1 schematically depicts a system for scheduling connected vehicles to cross non-signalized intersections. A system 100 includes a traffic management server 102. The traffic management server 102 may receive data from one or more connected vehicles, as disclosed herein. In the example of FIG. 1, connected vehicles 104, 106, 108, and 110 all approach a non-signalized intersection 112. However, it should be understood that in other examples, the system 100 may operate with any number of connected vehicles approaching an intersection. Each of the connected vehicles 104, 106, 108, 110 may be a human-driven connected vehicle or an autonomous connected vehicle. Each of the connected vehicles 104, 106, 108, 110 may be an automobile or any other passenger or non-passenger vehicle such as, for example, a terrestrial, aquatic, and/or airborne vehicle including, but not limited to, a bus, a scooter, a drone, or a bicycle.

The traffic management server 102 may be communicatively coupled to one or more of the connected vehicles 104, 106, 108, 110. In some examples, the traffic management server 102 may be a road-side unit (RSU) positioned near the intersection 112. In these examples, the system 100 may include any number of RSUs spaced along a road near different intersections such that each RSU covers a different service area. That is, as vehicles drive along one or more roads, the vehicles may be in range of different RSUs at different times such that different RSUs provide coverage at different locations. Thus, as vehicles drive along one or more roads, the vehicles may move between coverage areas of different RSUs.

In other examples, the traffic management server 102 may be another type of server or computing device and may be positioned remotely from the intersection 112. In some examples, the traffic management server 102 may be an edge server. In some examples, the traffic management server 102 may be a moving edge server, such as another vehicle. In some examples, the traffic management server 102 may be a cloud-based server.

As connected vehicles approach the intersection 112, the connected vehicles may transmit driving data to the traffic management server 102. The driving data transmitted by a connected vehicle may include a position and speed of the connected vehicle. In some examples, the driving data transmitted by a connected vehicle may also include other information such as an acceleration or desired acceleration of the vehicle and a planned trajectory of the vehicle.

After receiving driving data from a plurality of connected vehicles, the traffic management server 102 may schedule the connected vehicles to cross the intersection 112 in a particular order based on the driving data, using the techniques described herein. The traffic management server 102 may the transmit the order scheduled for the vehicles to cross the intersection and the vehicles may adjust their driving behavior to cross the intersection in the appropriate order as scheduled by the traffic management server 102.

Figure 2:
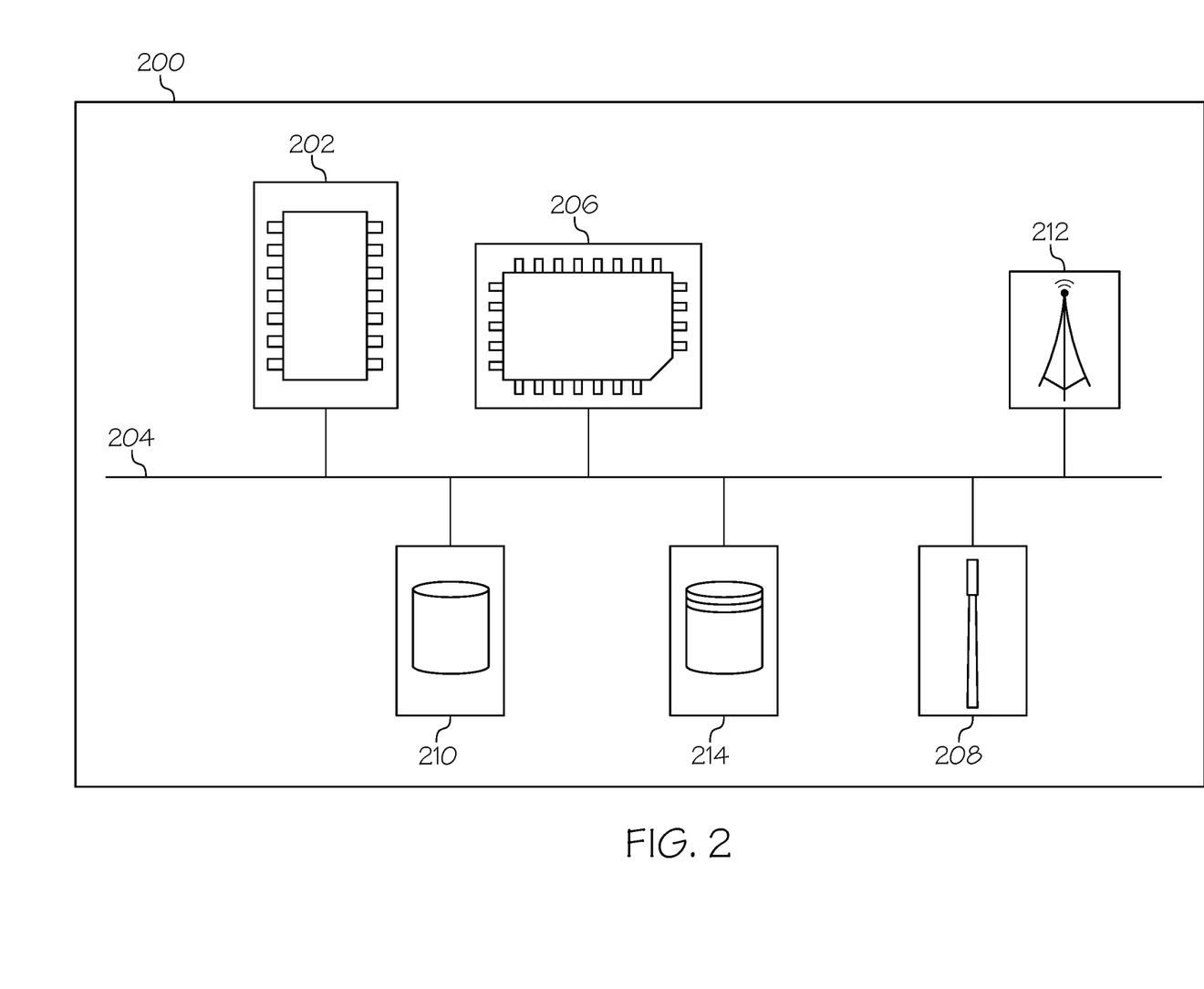
FIG. 2 depicts a schematic diagram of a vehicle system, according to one or more embodiments shown and described herein.

FIG. 2 depicts a vehicle system 200 that may be included in each of the connected vehicles 104, 106, 108, 110 of FIG. 1. The vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs. The vehicle system 200 may be included in a human-driven connected vehicle and in an autonomous connected vehicle.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the location of the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect other vehicles on the road. For autonomous vehicles, the vehicle system 200 may include an autonomous driving module and the data gathered by the sensors 210 may be used by the autonomous driving module to autonomously navigate the vehicle.

Still referring to FIG. 2, the vehicle system 200 comprises network interface hardware 212 for communicatively coupling the vehicle system 200 to the traffic management server 102 and/or another vehicle system. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit driving data (e.g., vehicle position and speed) to the traffic management server 102.

Still referring to FIG. 2, the vehicle system 200 comprises a data storage component 214. The data storage component 214 may store data used by various components of the vehicle system 200. In addition, the data storage component 214 may store data gathered by the sensors 210.

The vehicle system 200 may also include an interface. The interface may allow for data to be presented to a human driver and for data or other information to be input by the driver. For example, the interface may include a screen to display information to a driver, speakers to present audio information to the driver, and a touch screen that may be used by the driver to input information. In other examples, the vehicle system 200 may include other types of interfaces.

In some embodiments, the vehicle system 200 may be communicatively coupled to the traffic management server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
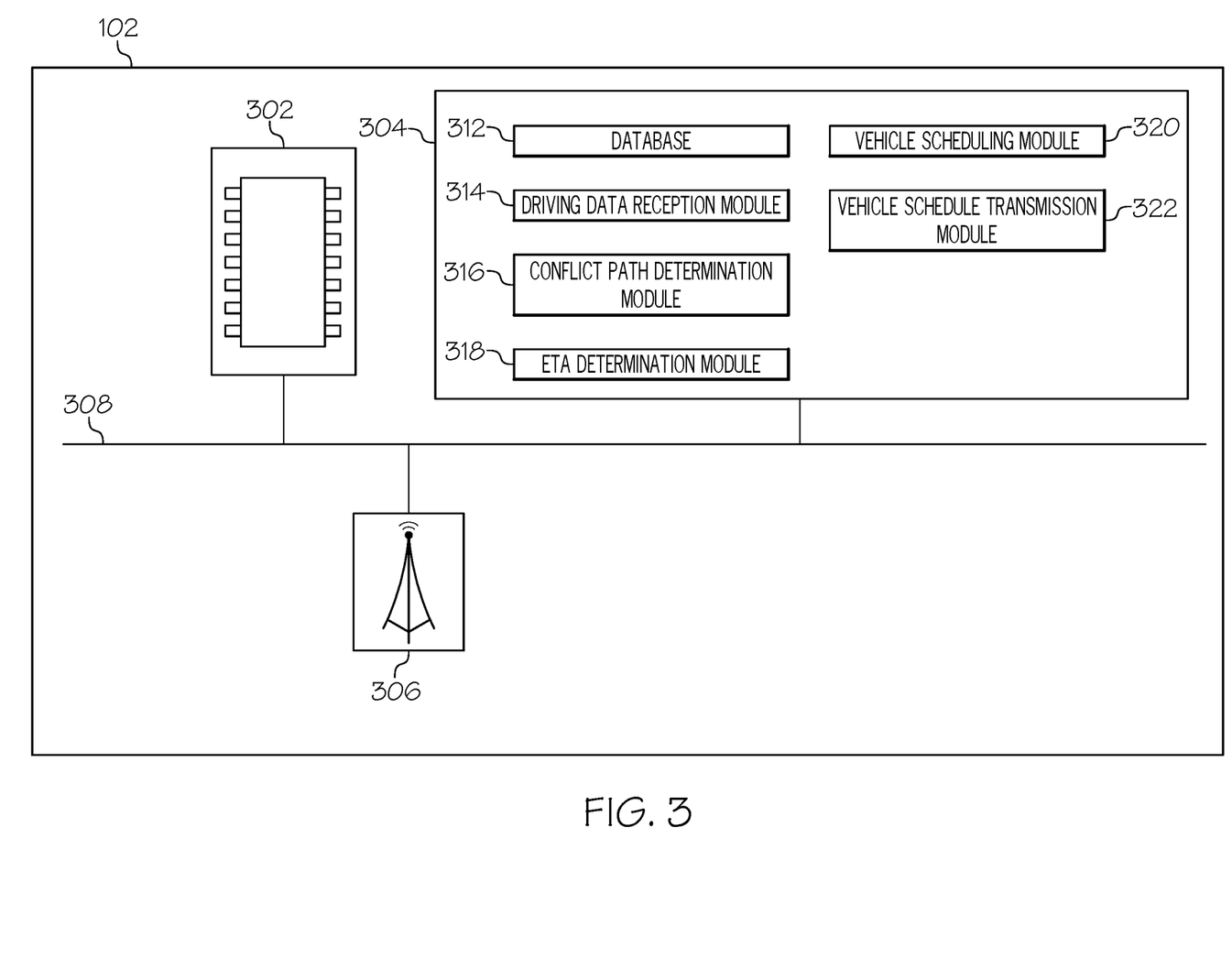
FIG. 3 depicts a schematic diagram of the traffic management server of FIG. 1, according to one or more embodiments shown and described herein.

Now referring to FIG. 3, the traffic management server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the traffic management server 102 may transmit and receive data to and from connected vehicles.

The one or more memory modules 304 include a database 312, a driving data reception module 314, a conflict path determination module 316, an ETA determination module 318, a vehicle scheduling module 320, and a vehicle schedule transmission module 322. Each of the database 312, the driving data reception module 314, the conflict path determination module 316, the ETA determination module 318, the vehicle scheduling module 320, and the vehicle schedule transmission module 322 may be a program module in the form of operating systems, application program modules, and other program modules stored in one or more memory modules 304. In some embodiments, the program module may be stored in a remote storage device that may communicate with the traffic management server 102. In some embodiments, one or more of the database 312, the driving data reception module 314, the conflict path determination module 316, the ETA determination module 318, the vehicle scheduling module 320, and the vehicle schedule transmission module 322 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store driving data received from connected vehicles. The database 312 may also store other data that may be used by the memory modules 304 and/or other components of the traffic management server 102.

The driving data reception module 314 may receive driving data from one or more connected vehicles. The driving data received by the driving data reception module 314 from a connected vehicle may include a position and speed of the connected vehicles. In some examples, the driving data received by the driving data reception module 314 from a connected vehicle may include other driving data about the connected vehicle such as an actual or preferred acceleration of the vehicle or a planned trajectory of the vehicle. The driving data received by the driving data reception module 314 may be used by the traffic management server 102 as disclosed herein.

The conflict path determination module 316 may determine whether a potential conflict path exists between two or more connected vehicles at a non-signalized intersection based on driving data received from the connected vehicles. When two or more vehicles approach a non-signalized intersection, there may be a conflict path between the vehicles. That is, two vehicles may have planned trajectories that may lead to a collision between the vehicles without modification to a speed or trajectory of at least one of the vehicles.

Figure 4:
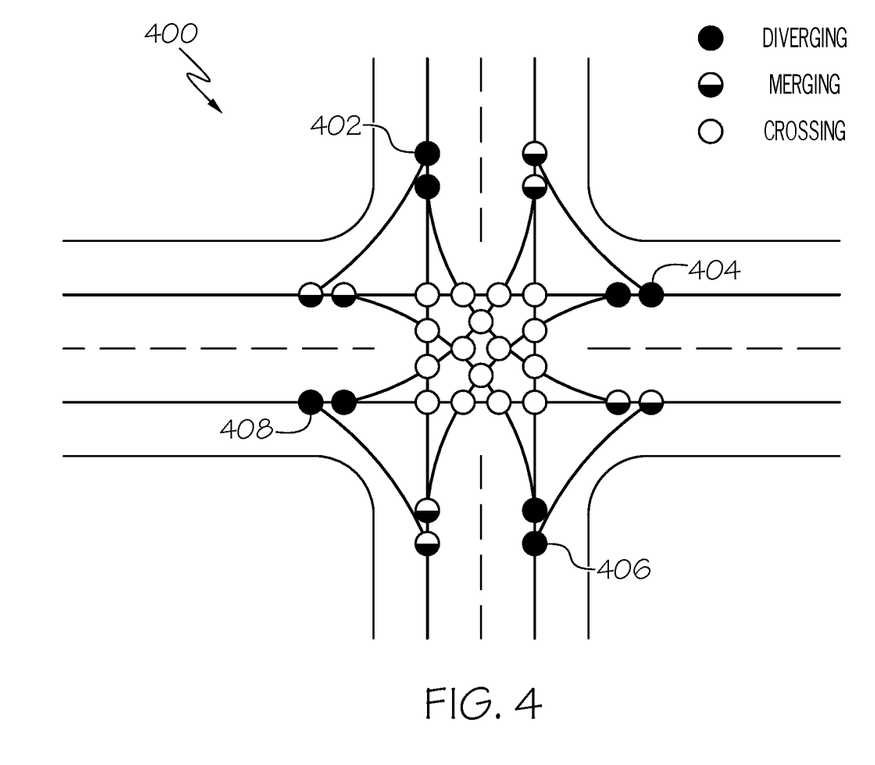
FIG. 4 illustrates potential conflict paths at a non-signalized intersection, according to one or more embodiments shown and described herein.

FIG. 4 illustrates an example intersection 400 and potential conflict points between vehicles. In the example of FIG. 4, a four-way non-signalized intersection is shown along with potential paths of four vehicles 402, 404, 406, and 408. As shown in FIG. 4, potential merging or crossing conflicts may exist between vehicles depending on the trajectories taken by each of the vehicles 402, 404, 406, 408.

The conflict path determination module 316 may determine whether a potential conflict path exists between two or more connected vehicles based on the planned trajectories of the vehicles. That is, the conflict path determination module 316 may determine whether the planned trajectories of two or more connected vehicles are scheduled to cross each other.

If two or more connected vehicles have planned trajectories such that the vehicles will cross an intersection without conflicting with each other, then the traffic management server 102 need not schedule the vehicles to cross the intersection. Rather, the vehicles can simply cross the intersection along their planned trajectories without modification. However, if the conflict path determination module 316 determines that a potential conflict path exists between two or more connected vehicles at a non-signalized intersection, then the traffic management server 102 may schedule the vehicles to cross the intersection to avoid any potential conflict, as disclosed herein.

Referring back to FIG. 3, the ETA determination module 318 may determine an estimated time of arrival for one or more connected vehicles to arrive at an intersection or at a conflict point identified by the conflict path determination module 316. The ETA determination module 318 may determine an estimated time of arrival based on the driving data received from the connected vehicles. As discussed above, the driving data received by the traffic management server 102 may include a location and speed of a connected vehicle. In addition, the traffic management server 102 may also have access to a location of an intersection that a connected vehicle is approaching. In some examples, this may be received from the connected vehicle itself. In some examples, the location of an intersection may be received from other traffic infrastructure (e.g., traffic cameras). In other examples, the location of an intersection may be stored in the database 312 (e.g., after receiving data from a map database).

Because the traffic management server 102 knows the location of an intersection and the location of a connected vehicle, the ETA determination module 318 may determine a distance $d_i$ between a connected vehicle i and the intersection or the conflict point. Then, in some examples, the ETA determination module 318 may determine an estimated time of arrival $t_i$ for the connected vehicle i to reach the intersection or the conflict point based on the distance $d_i$ between the vehicle and the intersection or the conflict point and the speed $v_i$ of the vehicle. In particular, the ETA determination module 318 may determine the estimated time of arrival as $$t_i = \frac{d_i}{v_i}.$$

In some examples, in addition to considering a speed of connected vehicles, the ETA determination module 318 may also consider an acceleration of connected vehicles when determining an estimated time of arrival. In these examples, the ETA determination module 318 assumes that, as a connected vehicle i approaches an intersection, the vehicle will accelerate at a rate of $a_i$ until reaching the intersection or reaching a speed of $v_{lim}$ (e.g., a speed limit or a desired cruising speed of the vehicle). The speed limit may be the speed limit of the road on which the vehicle is moving. The desired cruising speed may be determined based on driving history of the connected vehicle i under similar driving circumstances. In some examples, the acceleration rate $a_i$ may be a standard rate of acceleration assumed to be used for all vehicles. In other examples, the acceleration rate $a_i$ may be an actual or desired rate of acceleration of the particular connected vehicle. The acceleration rate $a_i$ may be determined based on driving history of the connected vehicle i under similar driving circumstances.

Figure 5A:
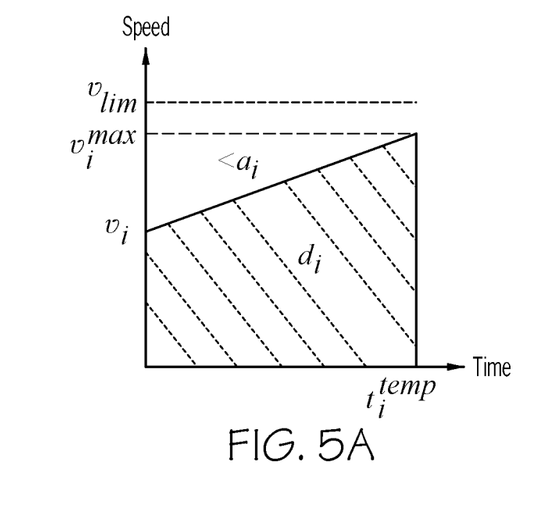
FIG. 5A illustrates an example acceleration profile of a vehicle approaching an intersection, according to one or more embodiments shown and described herein.

Accordingly, the ETA determination module 318 may consider two possible cases when a connected vehicle approaches an intersection. In the first case, the connected vehicle i begins traveling at speed $v_i$ and accelerates at a constant rate $a_i$ but reaches the intersection before reaching the speed $v_{lim}$. In this case, the vehicle has an acceleration profile as shown in FIG. 5A. As shown in FIG. 5A, the vehicle begins with a speed of $v_i$ and accelerates with acceleration $a_i$ up to a speed of $v_{imax}$ when it reaches the intersection, traveling a distance of $d_i$. Thus the total distance traveled is given by $d_i = v_i t_i + \frac{1}{2} a_i t_i^2$ and the time for the connected vehicle to reach the intersection in the first case is given by:

$$t_i = \frac{-v_i + \sqrt{v_i^2 + 2a_i d_i}}{a_i} \quad (1)$$

Figure 5B:
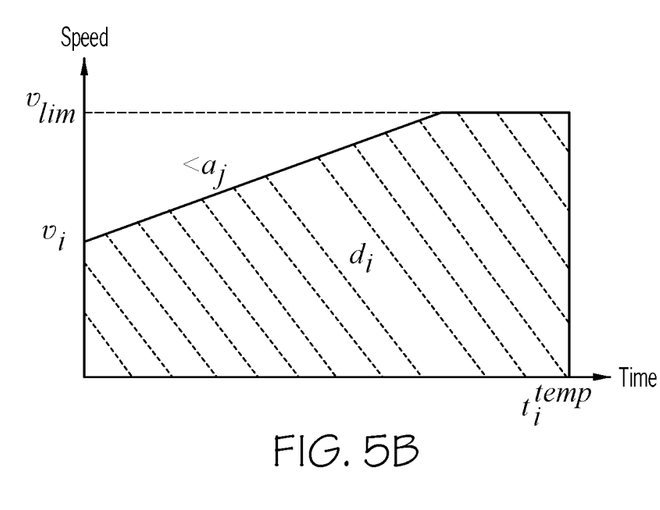
FIG. 5B illustrates another example acceleration profile of a vehicle approaching an intersection, according to one or more embodiments shown and described herein.

In the second case, the connected vehicle i begins traveling at speed $v_i$ and accelerates at a greater constant rate $a_j$ and reaches $v_{lim}$ before reaching the intersection. In this case, the vehicle has an acceleration profile as shown in FIG. 5B. As shown in FIG. 5B, the vehicle begins with a speed of $v_i$ and accelerates with acceleration $a_j$ until reaching a speed of $v_{lim}$. The vehicle then travels at constant speed $v_{lim}$ until reaching the intersection. Thus, the time for the connected vehicle to reach the intersection in the second case is given by:

$$t_i = \frac{(v_{lim} - v_i)^2 + 2a_j d_i}{2 a_j v_{lim}} \quad (2)$$

Thus, the ETA determination module 318 may determine an estimated time for a connected vehicle to reach an intersection using the techniques described above. Specifically, one of the two equations above may be used to estimate a time of arrival for a connected vehicle at an intersection depending on whether the distance $d_i$ to the intersection is sufficient for the vehicle i to accelerate from an initial velocity $v_i$ to $v_{lim}$ before reaching the intersection. This may provide a reasonable estimated time of arrival without considering traffic conditions. However, in some examples, the ETA determination module 318 may take additional steps to determine an estimated time of arrival in consideration of traffic conditions, as described below.

If a connected vehicle i approaches an intersection and there are no other vehicles in front of the connected vehicle, the above two equations may be used to estimate a time of arrival for the connected vehicle at the intersection. However, if there is a leading vehicle k in front of the connected vehicle i, then the connected vehicle i cannot arrive at the intersection before the connected vehicle k. As such, the ETA determination module 318 may consider an estimated time of arrival for the leading vehicle k before determining an estimated arrival time for the connected vehicle i.

Specifically, the ETA determination module 318 may determine an initial or temporary time of arrival $t_{itemp}$ for the connected vehicle i to arrive at the intersection using equation (1) or (2) above. The ETA determination module 318 may then determine an estimated time of arrival $t_k$ for the leading vehicle k to arrive at the intersection (e.g., using the techniques described above). It may then be assumed that a minimum time of $t_{headway}$ must elapse between when the leading vehicle k arrives at the intersection and when the connected vehicle i arrives at the intersection. Thus, the ETA determination module 318 may estimate a time of arrival for the connected vehicle i as the later of $t_{itemp}$ and $t_k + t_{headway}$. That is, the time for the connected vehicle to reach the intersection may be given by:

$$t_i = \max(t_{itemp}, t_k + t_{headway}) \quad (3)$$

Referring back to FIG. 3, the vehicle scheduling module 320 may schedule a plurality of connected vehicles to cross an intersection in a particular order based on estimated times of arrival for the connected vehicles to arrive at the intersection as determined by the ETA determination module 318.

In the illustrated example, a connected vehicle may be scheduled to cross an intersection by the vehicle scheduling module 320 once either the estimated time for the connected vehicle to reach the intersection is less than a predetermined threshold time (e.g., a reservation-trigger time constant) or the estimated distance from the connected vehicle to the intersection is less than a predetermined distance (e.g., a reservation-trigger geo-fence distance). That is, the vehicle scheduling module 320 may schedule a connected vehicle to cross an intersection when the vehicle is close enough to the intersection in either distance or time. However, in some examples, the connected vehicle may be scheduled only when the estimated time for the connected vehicle to reach the intersection is less than a predetermined threshold time. In other examples, the connected vehicle may be scheduled only when the distance to the intersection is less than a predetermined threshold distance.

In the illustrated example, once a connected vehicle is within a threshold time or a threshold distance from an intersection, the vehicle scheduling module 320 may schedule each connected vehicle approaching the intersection that has a potential conflict path with another connected vehicle, as determined by the conflict path determination module 316. In particular, the vehicle scheduling module 320 may consider the estimated time that each connected vehicle having a potential conflict path will arrive at the intersection, as determined by the ETA determination module 318. The vehicle scheduling module 320 may then schedule the connected vehicles to cross the intersection in the order of their estimated times of arrival at the intersection. For example, the vehicle with the earliest time of arrival may be scheduled first, the vehicle with the second earliest time of arrival may be scheduled second, and so on.

Figure 6:
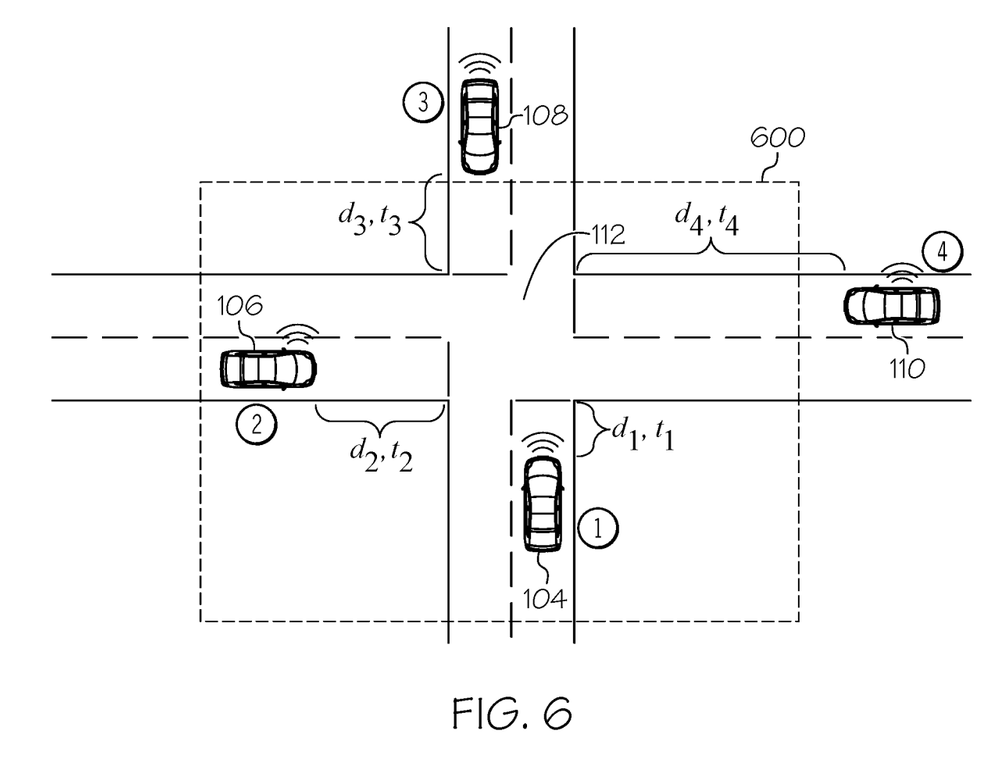
FIG. 6 illustrates an example scheduling of connected vehicles approaching an intersection, according to one or more embodiments shown and described herein.

FIG. 6 shows an example illustration of the vehicles 104, 106, 108, 110 of FIG. 1 approaching the intersection 112 that may be scheduled by the vehicle scheduling module 320. As illustrated in FIG. 6, vehicle 104 is positioned at a distance d1 from the intersection 112 and has an estimated time of arrival at the intersection 112 of t1. Similarly, vehicles 106, 108, and 110 are positioned at respective distances d2, d3, and d4 from the intersection 112 and have respective times of arrival at the intersection 112 of t2, t3, and t4.

A geo-fence area 600 is shown around the intersection, which may correspond to a reservation-trigger geo-fence distance. That is, connected vehicles may be scheduled by the vehicle scheduling module 320 when they are within the geo-fence area or when their expected time of arrival at the intersection is less than a reservation-trigger time constant. In the example of FIG. 6, vehicles 104 and 106 are both within the geo-fence area 600. The vehicles 108 and 110 are outside of the geo-fence area 600 but may be scheduled by the vehicle scheduling module 320 if their respective times of arrival t3 and t4 to the intersection 112 is less than a reservation-trigger time constant.

In the example of FIG. 6, the vehicles 104, 106, 108, 110 have respective arrival times to the intersection 112 such that t1<t2<t3<t4. Accordingly, the vehicle scheduling module 320 schedules the vehicle 104 to cross the intersection 112 first, the vehicle 106 to cross the intersection 112 second, the vehicle 108 to cross the intersection 112 third, and the vehicle 110 to cross the intersection 112 fourth, as shown in FIG. 6.

Referring back to FIG. 3, the vehicle schedule transmission module 322 may transmit an order of connected vehicles to cross a non-signalized intersection scheduled by the vehicle scheduling module 320 to the connected vehicles so scheduled. After receiving the scheduled order of connected vehicles to cross the intersection, the connected vehicles may adjust their driving behavior such that the vehicles cross the intersection in the scheduled order. For example, vehicles scheduled to cross the intersection later than other vehicles may reduce their speed such that the earlier scheduled vehicles may cross the intersection first. In some examples, the scheduled connected vehicles may communicate with each other to collectively establish driving behavior for each vehicle to ensure that the vehicles cross the intersection in the scheduled order.

In some examples, an autonomous connected vehicle receiving a vehicle scheduling from the vehicle schedule transmission module 322 may autonomously adjust its driving behavior to cross the intersection as scheduled. In other examples, a human-driven connected vehicle may display instructions to a driver such that the driver may adjust the driving behavior of the vehicle to cross the intersection as scheduled.

Figure 7:
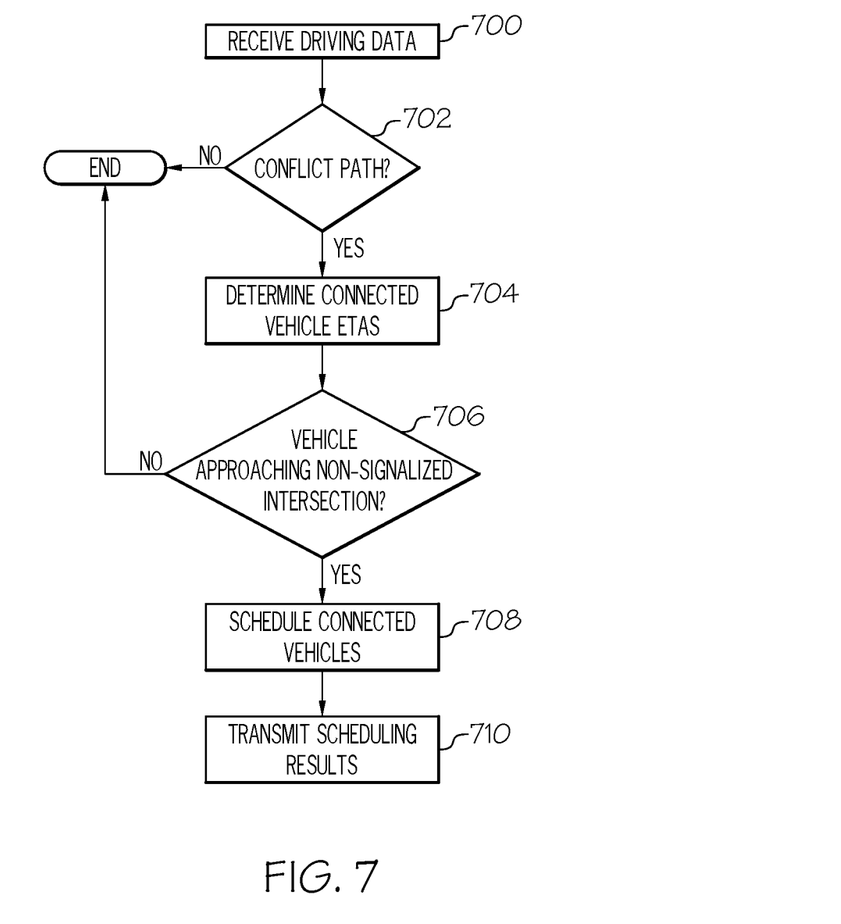
FIG. 7 depicts a flowchart of a method for operating the traffic management server of FIGS. 1 and 3, according to one or more embodiments shown and described herein.

FIG. 7 depicts a flowchart for operating the traffic management server 102 of FIGS. 1 and 3. At step 700, the driving data reception module 314 receives driving data from one or more connected vehicles. The driving data received by the driving data reception module 314 may include positions and vehicle speeds of connected vehicles. The driving data received by the driving data reception module 314 may also include accelerations, desired accelerations, and trajectories of connected vehicles.

At step 702, the conflict path determination module 316 determines whether two or more connected vehicles have potential conflicting paths based on planned trajectories of the connected vehicles. In particular, the conflict path determination module 316 determines whether two or more connected vehicles have conflicting paths at a non-signalized intersection. If the conflict path determination module 316 determines that there are no conflicting paths between connected vehicles (no at step 702), then the method of FIG. 7 ends. Alternatively, if the conflict path determination module 316 determines that two or more connected vehicles have conflicting paths (yes at step 702), then control passes to step 704.

At step 704, the ETA determination module 318 determines estimated times that connected vehicles for which driving data has been received by the driving data reception module 314 will arrive at an intersection for which the conflict path determination module 316 has determined that a potential conflict path exists. In embodiments, the ETA determination module 318 may determine estimated times of arrival based on the driving data received by the driving data reception module 314 using equations (1), (2), and (3) and the techniques described above.

At step 706, the vehicle scheduling module 320 determines whether a connected vehicle for which driving data has been received by the driving data reception module 314 is close enough to a non-signalized intersection having a potential conflict path, as determined by the conflict path determination module 316, to be scheduled to cross the intersection. In particular, the vehicle scheduling module 320 may determine whether the estimated time that the connected vehicle will arrive at the intersection is less than a reservation-trigger time constant or the distance between the connected vehicle and the intersection is less than a reservation-trigger geo-fence distance.

If the vehicle scheduling module 320 determines that the connected vehicle is not close enough to the intersection to be scheduled (no at step 706), then the method of FIG. 7 ends. Alternatively, if the vehicle scheduling module 320 determines that the connected vehicle is close enough to the intersection to be scheduled (yes at step 706), then control passes to step 708. In some examples, connected vehicles only transmit data to the traffic management server 102 when their estimated time of arrival to an intersection is less than a reservation-trigger time constant or their distance to the intersection is less than a reservation-trigger geo-fence distance. In these examples, step 706 may be removed from the method of FIG. 7.

At step 708, the vehicle scheduling module 320 schedules the connected vehicles that are close enough to the intersection to be scheduled to cross the intersection in a particular order. The vehicle scheduling module 320 may schedule the connected vehicles to cross the intersection based on the estimated time of arrival of each vehicle to the intersection.

At step 710, the vehicle schedule transmission module 322 transmits the results of the vehicle scheduling performed by the vehicle scheduling module 320. That is, the vehicle schedule transmission module 322 transmits, to the connected vehicles, the determined order that the vehicles should cross the intersection. The connected vehicles may receive the transmitted schedule and may adjust their driving behavior to ensure that the vehicles cross the intersection in the order scheduled by the traffic management server 102.

The steps of the method of FIG. 7 may be continually performed at periodic intervals. As such, as new vehicles approach an intersection, the traffic management server 102 may receive updated driving data and may determine updated times of arrival based on the updated driving data. The traffic management server 102 may then update the vehicle scheduling order for connected vehicles to cross the intersection. In particular, the traffic management server 102 may update the vehicle scheduling order at periodic intervals of a certain frequency.

The frequency at which the method of FIG. 7 is performed may be adjusted to modify the performance of the traffic management server 102. If the frequency at which the method of FIG. 7 is performed is relatively high, the order at which connected vehicles are scheduled to cross an intersection may frequently change, which may cause the vehicles to perform erratic driving behavior while adjusting to the changing schedule. However, if the frequency at which the method of FIG. 7 is performed is relatively low, the order at which connected vehicles are scheduled to cross an intersection may not be adjusted enough to account for new vehicles approaching the intersection that should be scheduled ahead of previously scheduled vehicles. As such, the frequency of operation of the traffic management server 102 may be adjusted to optimize performance based on these two factors.

Figure 8:
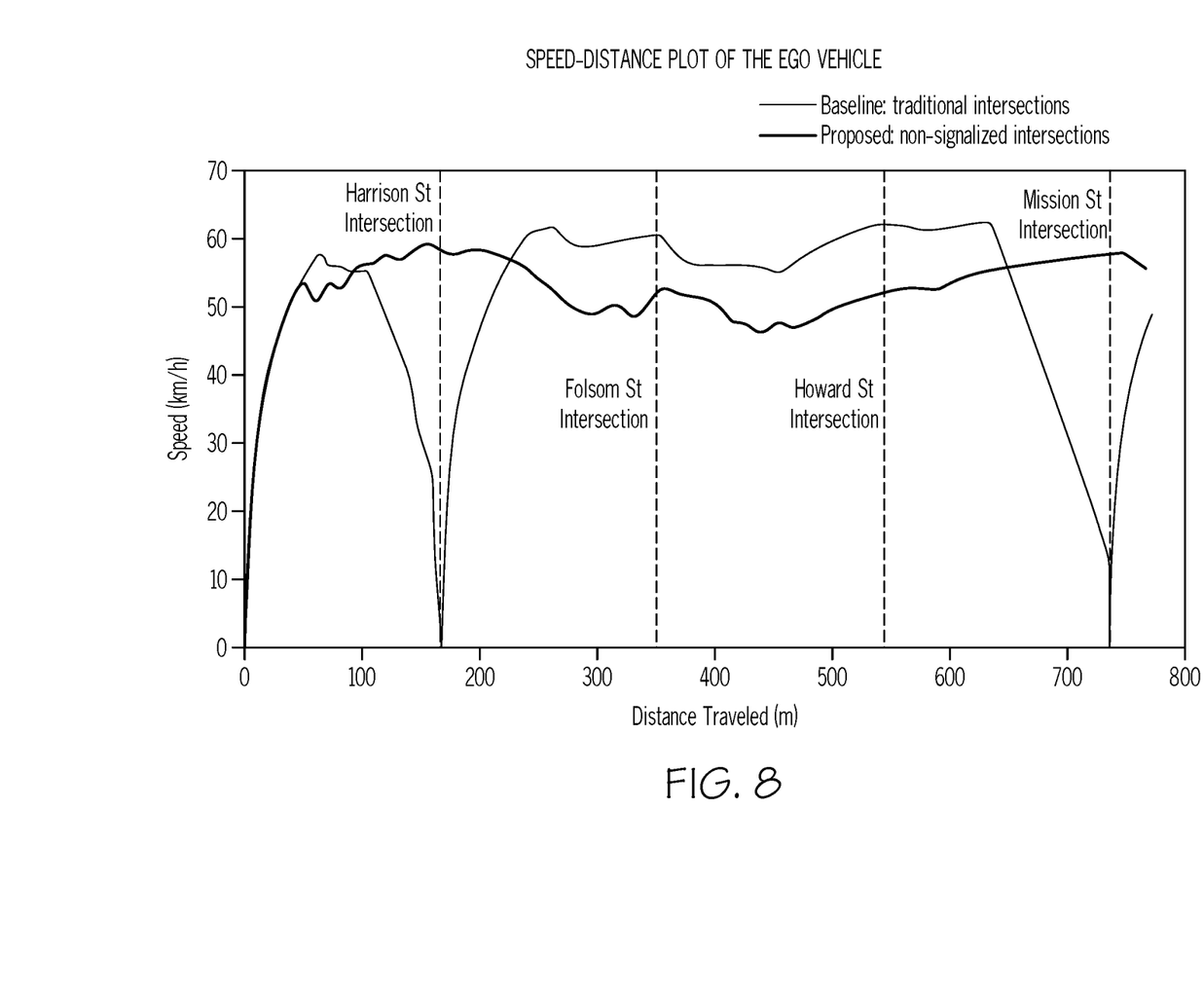
FIG. 8 illustrates example simulation results.

FIG. 8 shows simulation results comparing the performance of the proposed method of scheduling connected vehicles to cross a non-signalized intersection to the use of traffic signals at intersections. In particular, FIG. 8 shows a speed vs. distance plot for an ego vehicle traveling through four intersections. In a baseline scenario, a simulation is performed in which each intersection has a traffic light. Alternatively, in a non-signalized scenario, it is assumed that no traffic lights are present at the intersections and the method disclosed herein is utilized to control traffic flow at the intersections. As shown in FIG. 8, in the baseline scenario, the ego vehicle runs into red lights at the first and fourth intersections and must come to a complete stop. However, in the non-signalized scenario, the ego vehicle maintains a relatively stable speed while traveling through all four intersections, without coming to a full stop at any intersection. Although a higher maximum speed is reached in the baseline scenario, the excessive speed changes required in the baseline scenario significantly increase the overall travel time and energy consumption. In one simulation performed with many trials, the non-signalized scenario resulted in an average of a 20% reduction in travel time and a 23.7% reduction in fuel consumption compared to the baseline scenario. As such, the proposed system and method may significantly improve traffic flow and energy consumption.

It should now be understood that embodiments described herein are directed to a system and method for scheduling connected vehicles to cross non-signalized intersections. As a connected vehicle approaches a non-signalized intersection, the vehicle may transmit driving data to a traffic management server. The traffic management server may determine whether a potential conflict path exists with any other connected vehicles based on the planned trajectories of the connected vehicles. If any potential conflict paths exist, the traffic management server may determine an estimated time for each connected vehicle having a potential conflict path to arrive at the intersection based on driving data associated with each vehicle. The traffic management server may then schedule the connected vehicles to cross the intersection in a particular order based on the estimated time of each vehicle arriving at the intersection. The traffic management server may then transmit the scheduled order to the connected vehicles and the vehicles may adjust their driving behavior to ensure that they cross the intersection in the scheduled order.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    receiving driving data from a plurality of connected vehicles approaching an intersection, the driving data comprising speeds and positions of the connected vehicles;
    receiving values of desired accelerations from the connected vehicles;
    determining desired cruising speeds of the connected vehicles based on driving histories of the connected vehicles;
    determining estimated times of arrival that each of the connected vehicles will arrive at the intersection based on the driving data, the desired accelerations, and the desired cruising speeds;
    scheduling the connected vehicles to cross the intersection in a particular order based on the estimated times of arrival; and
    transmitting the scheduled order to the connected vehicles, causing one or more vehicles of the plurality of connected vehicles to adjust their driving behavior based on the scheduled order.

2. The method of claim 1, wherein the driving data further comprises an acceleration of the connected vehicle.

3. The method of claim 1, wherein the driving data further comprises a planned trajectory of the connected vehicle.

4. The method of claim 3, further comprising determining whether two or more of the connected vehicles have potential conflicting paths based on the driving data.

5. The method of claim 1, further comprising determining the estimated times of arrival based on a speed limit of each of roads on which the connected vehicles drive.

6. The method of claim 1, further comprising:
    determining whether a distance between each of the connected vehicles and the intersection is less than a predetermined threshold distance; and
    scheduling the connected vehicles to cross the intersection in the particular order based on the estimated times of arrival in response to determining that the distance between each of the connected vehicles and the intersection is less than the predetermined threshold distance.

7. The method of claim 1, further comprising:
    determining whether an estimated time of arrival that each of the connected vehicles will arrive at the intersection is less than a predetermined threshold time; and
    scheduling the connected vehicles to cross the intersection in the particular order based on the estimated times of arrival in response to determining that the estimated time of arrival that each of the connected vehicles will arrive at the intersection is less than a predetermined threshold time.

8. The method of claim 1, further comprising determining whether a distance between each of the connected vehicles and the intersection is less than a predetermined threshold distance and an estimated time of arrival that each of the connected vehicles will arrive at the intersection is less than a predetermined threshold time; and
    scheduling the connected vehicles to cross the intersection in the particular order based on the estimated times of arrival in response to determining that the distance between each of the connected vehicles and the intersection is less than the predetermined threshold distance and determining that the estimated time of arrival that each of the connected vehicles will arrive at the intersection is less than the predetermined threshold distance.

9. The method of claim 1, further comprising:
determining an estimated time of arrival for at least one of the connected vehicles to arrive at the intersection based on second driving data associated with a leading vehicle positioned in front of the at least one of the connected vehicles.

10. The method of claim 1, further comprising:
receiving updated driving data from the plurality of connected vehicles;
determining updated estimated times of arrival for the connected vehicles based on the updated driving data; and
at periodic intervals, scheduling the connected vehicles to cross the intersection in an updated order based on the updated estimated times of arrival.

11. A server comprising a controller configured to:
receive driving data from a plurality of connected vehicles approaching an intersection, the driving data comprising speeds and positions of the connected vehicles;
receive values of desired accelerations from the connected vehicles;
determine desired cruising speeds of the connected vehicles based on driving histories of the connected vehicles;
determine estimated times of arrival that each of the connected vehicles will arrive at the intersection based on the driving data, the desired accelerations, and the desired cruising speeds;
schedule the connected vehicles to cross the intersection in a particular order based on the estimated times of arrival; and
transmit the scheduled order to the connected vehicles, causing one or more vehicles of the plurality of connected vehicles to adjust their driving behavior based on the scheduled order.

12. The server of claim 11, wherein the driving data further comprises an acceleration of the connected vehicle.

13. The server of claim 11, wherein the driving data further comprises a planned trajectory of the connected vehicle.

14. The server of claim 13, wherein the controller is further configured to determine whether two or more of the connected vehicles have potential conflicting paths based on the driving data.

15. The server of claim 11, wherein the controller is further configured to determine the estimated times of arrival based on a speed limit of each of roads on which the connected vehicles drive.

16. The server of claim 11, wherein the controller is further configured to determine whether a distance between each of the connected vehicles and the intersection is less than a predetermined threshold distance or an estimated time of arrival that each of the connected vehicles will arrive at the intersection is less than a predetermined threshold time; and
schedule the connected vehicles to cross the intersection in the particular order based on the estimated times of arrival in response to determining that the distance between each of the connected vehicles and the intersection is less than a predetermined threshold distance or determining that the estimated time of arrival that each of the connected vehicles will arrive at the intersection is less than a predetermined threshold time.

17. The server of claim 11, wherein the controller is further configured to determine an estimated time of arrival for at least one of the connected vehicles to arrive at the intersection based on second driving data associated with a leading vehicle positioned in front of the at least one of the connected vehicles.

18. The server of claim 11, wherein the controller is further configured to:
receive updated driving data from the plurality of connected vehicles;
determine updated estimated times of arrival for the connected vehicles based on the updated driving data; and
at periodic intervals, schedule the connected vehicles to cross the intersection in an updated order based on the updated estimated times of arrival.

* * * * *